(12) United States Patent
Kuhbauch et al.

(10) Patent No.: US 9,080,679 B2
(45) Date of Patent: Jul. 14, 2015

(54) VALVE ASSEMBLY

(71) Applicant: FESTO AG & Co. KG, Esslingen (DE)

(72) Inventors: Heiko Kuhbauch, Kongen (DE); Ralf Starzmann, Reichenbach (DE)

(73) Assignee: FESTO AG & CO. KG, Esslingen (DE)

( * ) Notice: Subject to any disclaimer, the term of this patent is extended or adjusted under 35 U.S.C. 154(b) by 79 days.

(21) Appl. No.: 14/089,203

(22) Filed: Nov. 25, 2013

(65) Prior Publication Data

US 2014/0150912 A1   Jun. 5, 2014

(30) Foreign Application Priority Data

Dec. 1, 2012   (EP) ..................... 12008069

(51) Int. Cl.
*F16K 11/24*   (2006.01)
*F15B 13/08*   (2006.01)

(52) U.S. Cl.
CPC ............. *F16K 11/24* (2013.01); *F15B 13/0846* (2013.01); *F15B 13/0857* (2013.01); *F15B 13/0875* (2013.01)

(58) Field of Classification Search
CPC ... F16K 11/24; F15B 13/0846; F15B 13/0857
USPC ........................................................ 137/884
See application file for complete search history.

(56) References Cited

U.S. PATENT DOCUMENTS

| | | | | |
|---|---|---|---|---|
| 4,938,258 | A  * | 7/1990 | Sato ............................... | 137/884 |
| 5,222,524 | A  * | 6/1993 | Sekler et al. .................. | 137/884 |
| 5,522,431 | A  * | 6/1996 | Bonacorsi et al. ............ | 137/884 |
| 6,200,157 | B1 * | 3/2001 | Ams et al. ..................... | 439/409 |
| 6,761,596 | B2 * | 7/2004 | Kuhbauch et al. ............ | 439/700 |
| 7,377,481 | B2 * | 5/2008 | Narita et al. ............ | 251/129.15 |
| 7,690,398 | B2 * | 4/2010 | Kuhbauch ..................... | 137/884 |
| 7,849,881 | B2 * | 12/2010 | Lee et al. ....................... | 137/884 |
| 7,925,811 | B2 * | 4/2011 | Ottliczky et al. ............. | 710/301 |

FOREIGN PATENT DOCUMENTS

| | | |
|---|---|---|
| DE | 10036086 | 3/2001 |
| DE | 20107330 | 8/2001 |
| DE | 102008050606 | 4/2009 |
| EP | 1059458 | 12/2000 |
| EP | 1710447 | 11/2007 |
| WO | WO2009120942 | 10/2009 |

* cited by examiner

*Primary Examiner* — John Fox
(74) *Attorney, Agent, or Firm* — Hoffmann & Baron, LLP

(57) ABSTRACT

A valve assembly including a valve support and electrically actuated valves mounted thereon. A reception passage includes a control circuit board contacted to the valves extends in the valve support. In the interior of the valve support, there further extend several electric conduction rods which are responsible for power supply and which are electrically contacted to the control circuit board via takeoff contact means.

23 Claims, 4 Drawing Sheets

VALVE ASSEMBLY

BACKGROUND OF THE INVENTION

The invention relates to a valve assembly comprising a valve support and a plurality of electrically actuated valves arranged successively in a line-up direction on the outside of the valve support, wherein a reception passage is formed in the interior of the valve support for the reception of a control circuit board which is provided with at least one control electronics and extends in the line-up direction, and to which the installed valves are electrically contacted for receiving electric actuating signals required for their operation, and which is provided with control interfacing means for the reception of electric control signals responsible for the generation of the actuating signals, and wherein electric supply lines for the power supply of the valves independent of the supply of the control signals are accommodated in the interior of the valve support.

A valve assembly of this type, which is known from EP 1 710 447 B1, comprises a plate-shaped valve support which is segmented in its longitudinal direction and has an external mounting surface on which a plurality of electrically actuated valves is mounted. The valves are lined up in a line-up direction which coincides with the longitudinal direction of the valve support. For the electric actuation of the valves, a multipart control circuit board extends in the interior of the valve support; this is provided with at least one control electronics and is electrically contacted to the valves in order to provide them with control signals which predetermine their operating state and which are generated on the basis of externally fed-in actuating signals. To ensure that the valve assembly operates reliably even at a high power consumption of the individual valves, the control circuit board further comprises electric supply lines for the power supply of the valves independent of the control signals. To cope with a high power demand, the valve assembly is provided with several feed-in points for the power supply, which involves a relatively high degree of constructive effort and, if a great number of valves is involved, results in an undesirable increase of the overall length of the valve assembly.

As far as the applicant is aware without being able to supply any published evidence, there are proposals for solving the problem of the power supply of valve assemblies, according to which the control circuit board and the electric supply lines are placed outside the valve support, the supply lines being represented by rod-shaped copper elements.

SUMMARY OF THE INVENTION

The invention is based on the problem of providing measures which would ensure a secure power supply for a valve assembly even at high power consumption while maintaining compact dimensions.

To solve this problem, the invention provides that the electric supply lines are represented by electric conduction rods separate from the control circuit board and secured to the valve support independently of the control circuit board, wherein they extend next to the control circuit board in the line-up direction and are electrically contacted to the control circuit board by takeoff contact means.

In this way, the actuating energy for the valves of the valve assembly can be supplied independent of the control signals predetermining the operating state of the valves, and to form the electric supply lines, electric conduction rods are used which are separate from the control circuit board. It is therefore possible to provide the electric conduction rods with a cross-section of optimum size for carrying high amperages without affecting the design of the control circuit board. As both the control circuit board and the electric conduction rods are accommodated in the interior of the valve support, they are optimally protected against the environment, and the valve assembly can be used even in an environment with a high relative humidity without any reduction of its functionality. The possibility of making the cross-section of the electric conduction rods independent of the dimensions of the control circuit board allows for particularly large cross-sections of the electric conduction rods if required, so that a very large number of valves can easily be supplied without having to take complex and expensive intermediate feed-in measures for the supply voltage. In most cases, a single feed-in interface for each electric conduction rod will be sufficient in order to ensure the power supply of all valves of the valve assembly.

Advantageous further developments of the invention can be derived from the dependent claims.

The electric conduction rods are expediently designed such that that they have a takeoff surface on the outside, with which one or more takeoff contact means are in contact for taking off the supply current and transferring it into the control circuit board for supplying the individual valves. The takeoff surface is preferably flat.

At least one and preferably each of the electric conduction rods is in particular arranged such that the takeoff surface is located in the reception passage of the valve support or at least bounds the reception passage. This allows for an immediate proximity to the control circuit board, which in turn allows short takeoff contact means to be used.

The takeoff contact means are preferably designed such that they bear against the associated takeoff surface under spring preload. The takeoff contact means are particularly as a whole designed as spring contact elements. This eliminates the need for a permanent connection between the takeoff contact means and the electric conduction rods. This in particular also facilitates the assembly of the valve assembly, because the control circuit board fitted with the spring contact elements can simply be inserted into the reception passage, being contacted to the electric conduction rods via its spring contact elements in the insertion process.

At least one and preferably each of the electric conduction rods expediently has an electrically conductive core body made of metal, with a copper alloy being particularly suitable. At least at the points where the electric conduction rod is in contact with the valve support, the core body is expediently surrounded by an insulation body. This is particularly recommended if the valve support is made of metal. It prevents short-circuit currents. The regions of the core body to which the takeoff contact means are applied are not covered by the insulation body. Each electric conduction rod is preferably provided with a takeoff surface for the takeoff contact means, which extends in the longitudinal direction of the electric conduction rod and which is not covered by the insulation body throughout.

The insulation body may for example be an insulating coating, in particular of a plastic material, of the core body. Particularly expedient is an implementation in the form of a sheathing element having a certain degree of intrinsic stability and made of an insulating material, which is pushed onto the core body.

The takeoff contact means expediently are parts of the control circuit board. This offers the possibility to install the electric conduction rods before the control circuit board is installed into the valve support. As the control circuit board is then inserted, the takeoff contact means come into contact with the electric conduction rods.

The control circuit board expediently has a circuit board body to which the takeoff contact means are secured.

Each electric conduction rod is preferably contacted by several takeoff contact means which are arranged at a distance from one another in the line-up direction. This multiple power takeoff reduces the amperage within the individual takeoff contact means, allowing the use of smaller material cross-sections.

At least one and preferably all of the electric conduction rods is/are installed into the valve support in such a way that it/they is/are held in a mounting groove which is formed in the valve support, extends in the line-up direction and is open towards the reception passage. Each electric conduction rod is preferably accommodated in a mounting groove with its whole cross-section. In this context, it is advantageous if a takeoff surface of each electric conduction rod, which is used for contacting the takeoff contact means, is aligned flush with the adjoining wall surface of the reception passage.

At least one and preferably all of the electric conduction rods preferably has/have a non-circular external cross-sectional contour. This facilitates a non-rotational location in the valve support without any complex measures. Positive locking on its own can provide security against rotation and ensure that a takeoff surface used for contacting the takeoff contact means adopts and maintains the desired orientation relative to the control circuit board as soon as the electric conduction rod is installed.

In a particularly expedient embodiment, a polygonal and in particular a hexagonal external contour of the electric conduction rod is provided. A regular polygonal contour is preferably chosen.

To provide the positive and the negative potential, the valve assembly expediently comprises two electric conduction rods, one of which is acting as an earth pole. The two electric conduction rod are expediently arranged in the interior of the valve support at a transverse distance from one another, with a free space in between into which the control circuit board projects. The control circuit board has a plurality of takeoff contact means, of which first takeoff contact means are in electric contact with one electric conduction rod and second takeoff contact means are in electric contact with the other electric conduction rod.

If the takeoff contact means bear against the electric conduction rods under spring preload, an advantageous configuration can be provided in which the control circuit board is held or clamped between the two electric conduction rods by a resilient force of the takeoff contact means.

It is further advantageous if the control circuit board is provided with several supporting posts by which it is supported on the wall of the reception passage. This support in particular provides a counterforce for the spring contact means which are assigned to the valves and bear against the control circuit board for receiving the actuating signals.

The reception passage of the valve support is expediently designed in the manner of a groove and therefore has a longitudinal slot-shaped opening which can be used as a mounting opening for the control circuit board. The control circuit board can easily be inserted into the reception passage through this mounting opening. By means of a preferably provided cover strip, the mounting opening can be closed after the installation of the control circuit board, preventing the ingress of impurities or moisture.

The control circuit board can be a single part or a multipart unit. In a multipart design, it comprises a plurality of circuit board elements which are lined up in the line-up direction and are at least electrically connectable or connected to one another. Connecting interface means on each circuit board element enable successive circuit board elements to be interconnected electrically. Apart from these electromechanical connections, the circuit board elements are preferably not secured to one another mechanically, although it is possible to couple the circuit board elements together in a stable manner by purely mechanical means in addition to the electromechanical connection.

The multipart structure facilitates a modular grouping of the valve assembly. Depending on the desired overall length of the valve assembly and the desired number of valves, a suitable number of circuit board elements can be used to form the control circuit board.

At least one of the coupled circuit board elements is provided with the control interfacing means for feeding in the control signals responsible for generating the actuating signals.

BRIEF DESCRIPTION OF THE DRAWINGS

The invention is explained in greater detail below with reference to the accompanying drawing, of which.

DETAILED DESCRIPTION OF THE PREFERRED EMBODIMENTS

Figure 1:
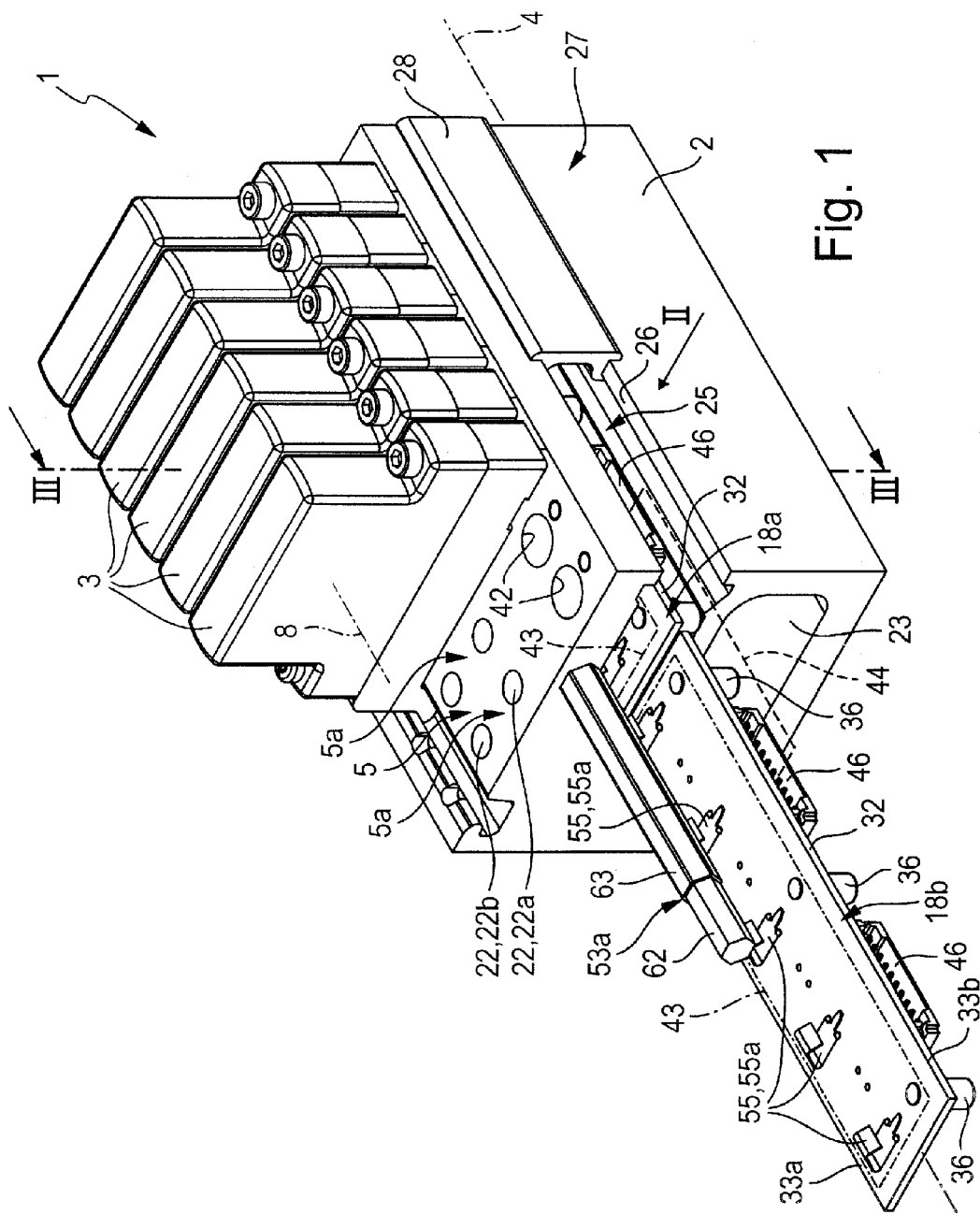
FIG. 1 is a perspective view of a preferred embodiment of the valve assembly according to the invention, which is partially cut for clarity.

The valve assembly, which is identified by the reference number 1 as a whole, comprises a valve support 2 on which a plurality of electrically actuated valves 3 is mounted, preferably in a releasable manner. The valves 3 are designed for the control of a fluid flow. In the illustrated embodiment, they have a 2/2 functionality, so that they act as shutoff valves capable of preventing or permitting a fluid flow through themselves.

The valve support 2 preferably has an oblong shape with a longitudinal axis 4. In the illustrated embodiment, it is designed as a single part. In a variant which is not illustrated, the valve support 2 is composed of individual valve support modules lined up in the longitudinal direction.

The valve support 2 is preferably made of metal, in particular of an aluminium material or stainless steel.

On its longitudinal outer side, the valve support 2 is provided with a mounting surface 5 on which the valves 3 are arranged. In the illustrated embodiment, the valves 3 are mounted individually. Each of them may for example be releasably secured by means of a mounting hook 6 and a mounting screw 7.

The valves 3 are arranged on the mounting surface 5 in a line-up direction 8 indicated by a dot-dash line. The line-up direction 8 expediently coincides with the axial direction of the longitudinal axis 4. In each valve 3 there extend several valve passages 12 which terminate towards a base surface 13 of the respective valve 3, which faces the mounting surface 5. In the interior of the valve 3, the valve passages 12 lead to valve means 14 indicated by dot-dash lines, which contain a movable valve member which in the illustrated embodiment can optionally be positioned in an open position or a closed position in order to allow or block a fluid transfer between a first (12a) and a second (12b) of the valve passages 12.

The valve means 14 can be actuated by an electrically activated actuating device 15 of each valve 3 as indicated by dot-dash lines. The actuating device 15 of the illustrated embodiment is a solenoid device. Alternatively, other electrically activated actuating devices 15 can be used, for example a piezoelectric drive.

The actuating device 15 is activated by electric actuating signals which can be fed in via electric connecting means 16 of the valve 3. Each of the electric connecting means 16 has a connecting end section 17 which projects beyond the base surface 13 in the region of the base surface 13. The connecting end section 17 is preferably provided with spring contact means 17a for providing a tolerance-independent secure electric connection when contacting a control circuit board 18 to be described later.

In the line-up direction 8, the mounting surface 5 is divided into a plurality of mounting locations 5a, on each of which one of the valves 3 is mounted. Two valve support passages 22 which allow fluid to pass through and which extend in the valve support 2 terminate at each mounting location 5a. A first (22a) of these valve support passages 22 is a feed passage, while a second (22b) valve support passage 22 acts as an operating passage.

The two valve passages 12, 12a, 12b terminate at the base surface 13 in such a way that each is connected to one of the two valve support passages 22, 22a, 22b.

All first valve support passages 22a communicate with a supply passage 23 which passes through the valve support 3 in the longitudinal direction and which leads to a connecting means not shown in the drawing, through which a pressure medium under positive pressure can be fed into the supply passage 23 and therefore be applied continuously to all first valve support passages 22a. The pressure medium is compressed air in particular.

The second valve support passages 22b individually terminate towards the outer surface of the valve support 2 with an operating port 24 each. If required, external fluid lines leading to one or more loads can be connected there.

In the operation of the valve assembly 1, the valves 3 can be actuated individually by electric control signals fed in via the connecting means 16 in such a way that they either let pass the pressure medium applied to the supply passage 23 into the second valve support passage 22b or else block its passage. In this way, the passage of fluid from the second valve support passage 22b can be controlled.

Pressure medium, in particular compressed air, discharged from the operating port 24 can for example be used, if discharged in a pulsed arrangement, to perform a sorting function on objects moving past.

In the interior of the valve support 2, a reception passage 25 is formed which extends in the line-up direction 8 and has a length which at least extends along the entire length of the mounting surface 5. This reception passage 25 accommodates the control circuit board 18 mentioned above.

The reception passage 25 is preferably formed externally in the valve support 2 in the manner of a longitudinal groove. It therefore has a slot-like opening which is identified as mounting opening 26 in view of its function. The control circuit board 18 can be installed into the reception passage 25 through the mounting opening 26 and removed again if required.

The mounting opening 26 is expediently located on a longitudinal outer surface 27 of the valve support 2 which adjoins the mounting surface 5, extending in particular at right angles to the mounting surface 5.

The valve assembly 1 is expediently provided with a cover strip 28 which can be releasably fitted to the valve support 2 in a covering position in which it tightly seals the mounting opening 26. The cover strip 28 can in particular be secured to the valve support 2 by means of a latching connection. FIG. 1 only shows a part of the length of the cover strip 28, so that both the open mounting opening 26 and the covering function of the cover strip 28 can be recognised.

The control circuit board 18 has a longitudinal dimension and is located in the reception passage 25 in such a way that its longitudinal direction extends in the line-up direction 8 of the valves 3.

The control circuit board 18 comprises a circuit board body 32 of a flat shape, which is expediently oriented such that its main dimensional plane 32a extends parallel to the mounting surface 5.

The control circuit board 18 has a rear longitudinal edge 33a and opposite thereto a front longitudinal edge 33b. The rear longitudinal edge 33a faces the base surface 34 of the reception passage 25, which is opposite the mounting opening 26. The front longitudinal edge 33b points towards the mounting opening 26.

In the illustrated example, the control circuit board 18 obtains its preferred orientation as mentioned above by providing that its rear longitudinal edge 33a engages with a centring groove 35 of the valve support 2, which is formed in the base surface 34 and extends in the line-up direction 8, and by further providing that it is supported on a lower wall surface 37 of the reception passage 25, which faces the mounting surface 5, by means of several supporting posts 36.

The supporting posts 36 are provided in a plurality and distributed at a distance from one another in the line-up direction 8 on the underside 38a of the circuit board body 32, which faces the lower wall surface 37. The supporting posts 36 are permanently joined to the circuit board body 32, for example by means of a screw fixing or a bonded joint.

Each mounting location 5a in the valve support 2 has an opening 42 which terminates towards the mounting surface 5 with one end and in the interior of the reception passage 25 with the other end. Each valve 3 projects with its connecting means 16 through at least one such opening 42 into the reception passage 25. In the interior of the reception passage 25, the connecting means 16 are supported with their spring contact means 17a on the top side 38b of the circuit board body 32 opposite the underside 38a, expediently in a region the distance of which from the rear longitudinal edge 33a precisely matches that of the supporting posts 36. In this way, pressure is applied to the control circuit board 18 in a region remote from the rear longitudinal edge 33a from above by the spring contact means 17a, and its supporting posts 36 are pressed against the lower wall surface 37. As a result, the control circuit board 18 is aligned accurately in the interior of the reception passage 25.

The control circuit board 18 is provided with at least one control electronics 43 or, in other words, with at least one control electronic means 43, which is responsible for generating the electric actuating signals which have to be transmitted to the valves 3. In the illustrated embodiment, the control circuit board 18 is provided with several control electronics 43, which is due to the fact that the control circuit board 18 is composed of a plurality of circuit board elements 18a, 18b lined up in the line-up direction 8. Each of these circuit board elements 18a, 18b contains its own control electronics 43. Using this multiple arrangement, a control circuit board 18 of variable length can be formed by lining up any number of circuit board elements.

Each of these circuit board elements 18a, 18b occupies a longitudinal section of the circuit board body 32, and there is no direct mechanical connection between these longitudinal sections. The circuit board elements 18a, 18b therefore are individual units. However, immediately adjacent circuit board elements 18a, 18b are electromechanically connected to one another by electric connecting conductors 44, resulting in an electric bus interconnection which extends over all circuit board elements 18a, 18b. The electric connecting conductors 44 are preferably represented by one or more flexible cables, expediently using flat ribbon cables.

Figure 3:
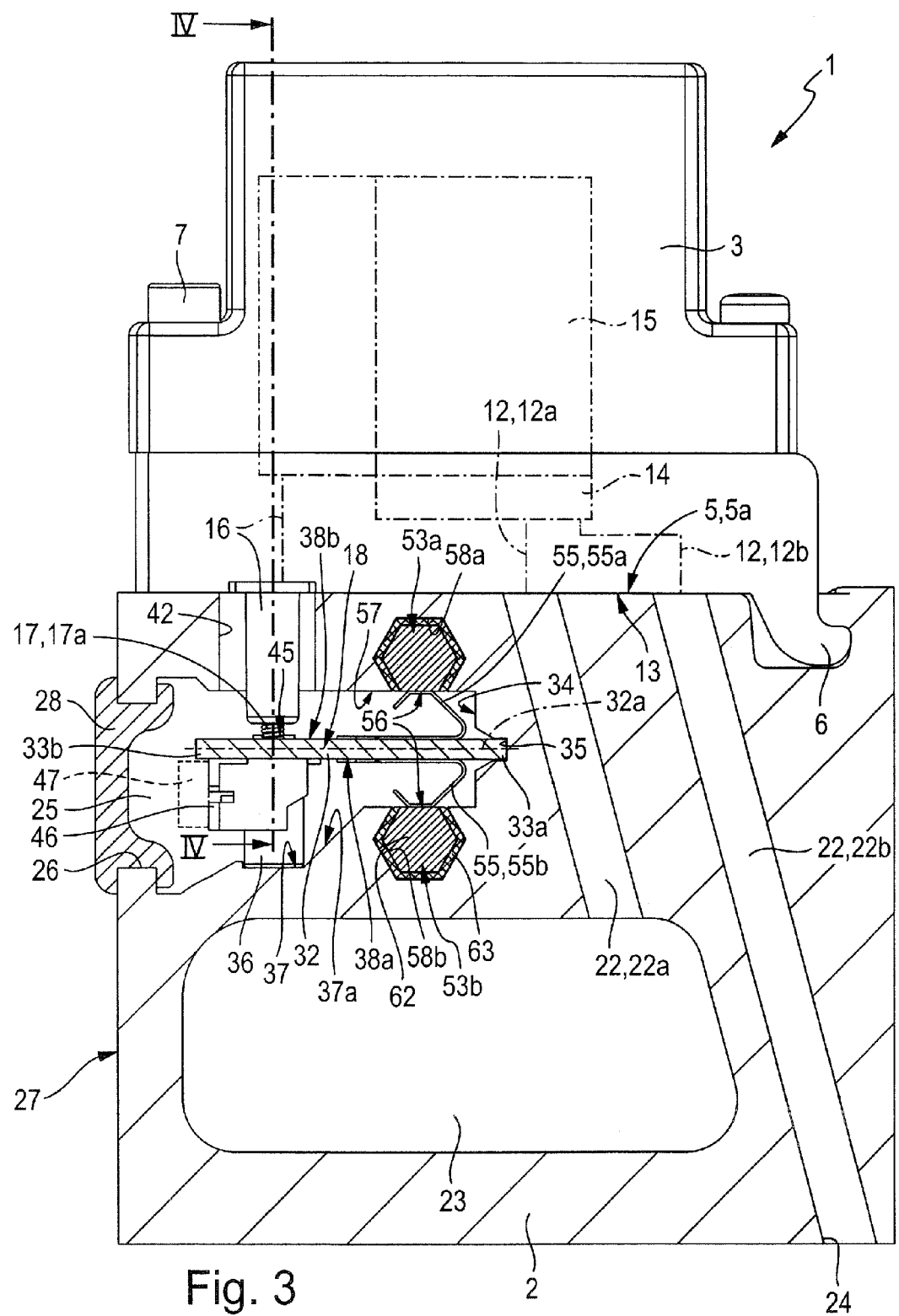
FIG. 3 is a longitudinal section through the valve assembly from FIGS. 1 and 2 along line III-III.
Figure 4:
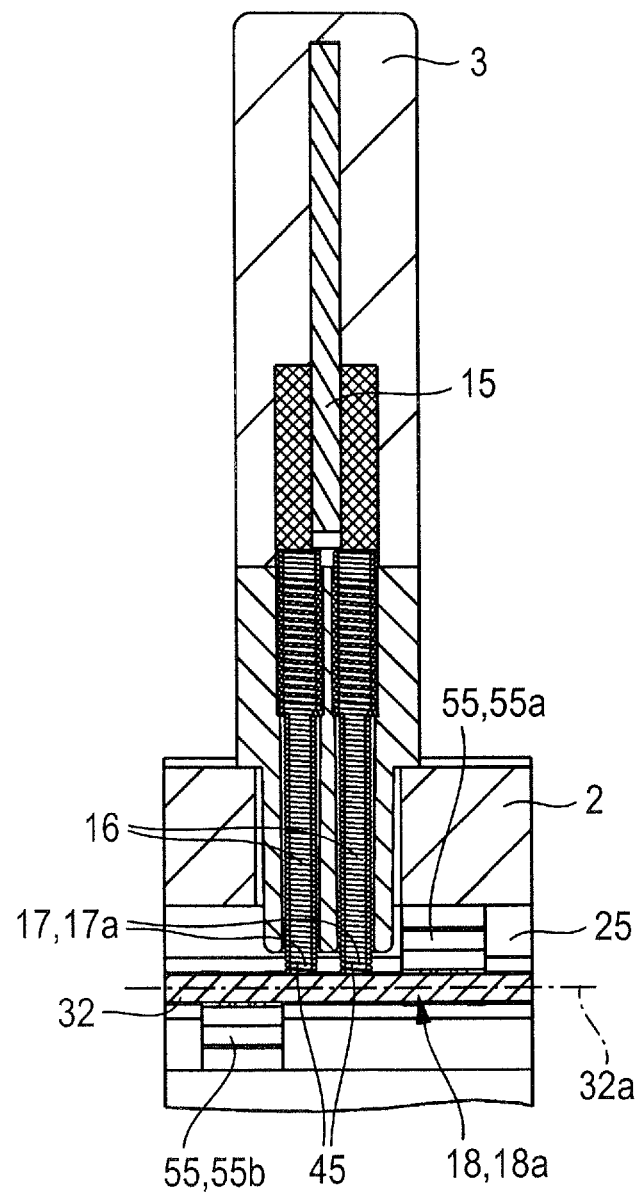
FIG. 4 shows a section of the valve assembly in the region of a valve mounted on the valve support along line IV-IV from FIG. 3.

To make this electric interconnection of the circuit board elements 18a, 18b possible, each of the circuit board elements 18a, 18b has two interconnection interfaces 46 arranged at a distance from one another in the line-up direction 8. To establish the electric connection between the two circuit board elements 18a, 18b, the electric connecting conductors 44 are connected to those interconnection interfaces 46 of one and the other circuit board element 18a, 18b which are adjacent to one another in the line-up direction 8. For this purpose, the electric connecting conductors 44 can be provided at the ends with plugs 47 as indicated in FIG. 3, which can be inserted into the interconnection interfaces 46 designed as mating connectors.

The interconnection interfaces 46 can be omitted if a single-part control circuit board 18 is used from the start.

To install the control circuit board 18, the individual circuit board elements 18a, 18b can be inserted either individually or together through the open mounting opening 26 into the reception passage 25. The electric connecting conductors 44 are fitted either in advance or later.

On the top side 38b of the circuit board body 32, there is a number of contact surfaces 45 matching the number of connecting end sections 17 and electrically connected to the associated control electronics 43. These are arranged such that one of the connecting end sections 17 of the valves 3, which are preferably designed as spring contact means 17a, bears against each of the contact surfaces 45. In this way, each of the valves 3 is electrically connected to a control electronics 43.

The control circuit board 18 comprises electromechanical interfacing means which will hereinafter be referred to as control interfacing means 48 and which are designed to receive the electric control signals responsible for the generation of the electric actuating signals. The electric control signals are usually provided by an electronic control device not shown in the drawing, which is connected to the control interfacing means 48 and which may either be an external device or an internal component of the valve assembly 1.

If the control circuit board 18 is provided with interconnection interfaces 46, an interconnection interface 46 which is not used for electric interconnection is expediently used as control interfacing means 48. This applies to the illustrated embodiment. In this embodiment, an interconnection interface 46 assigned to an axial end region of the control circuit board 18 is used as control interfacing means 48; two control lines coming from an electronic control device not shown here and connected to the control interfacing means 48 are indicated by broken lines at 52.

The electric supply energy required for the actuation of the valves 3 is not provided via the control interfacing means 48, but by means of two electric conduction rods 53a, 53b. These electric conduction rods 53a, 53b act as internal electric supply lines of the valve support 2 and enable the valves 3 to be supplied with power independently of the supply of the electric control signals.

The electric conduction rods 53a, 53b are placed in the interior of the valve support 2; they are separate from the control circuit board and also secured to the valve support 2 in a manner which is independent of the control circuit board 18.

Figure 2:
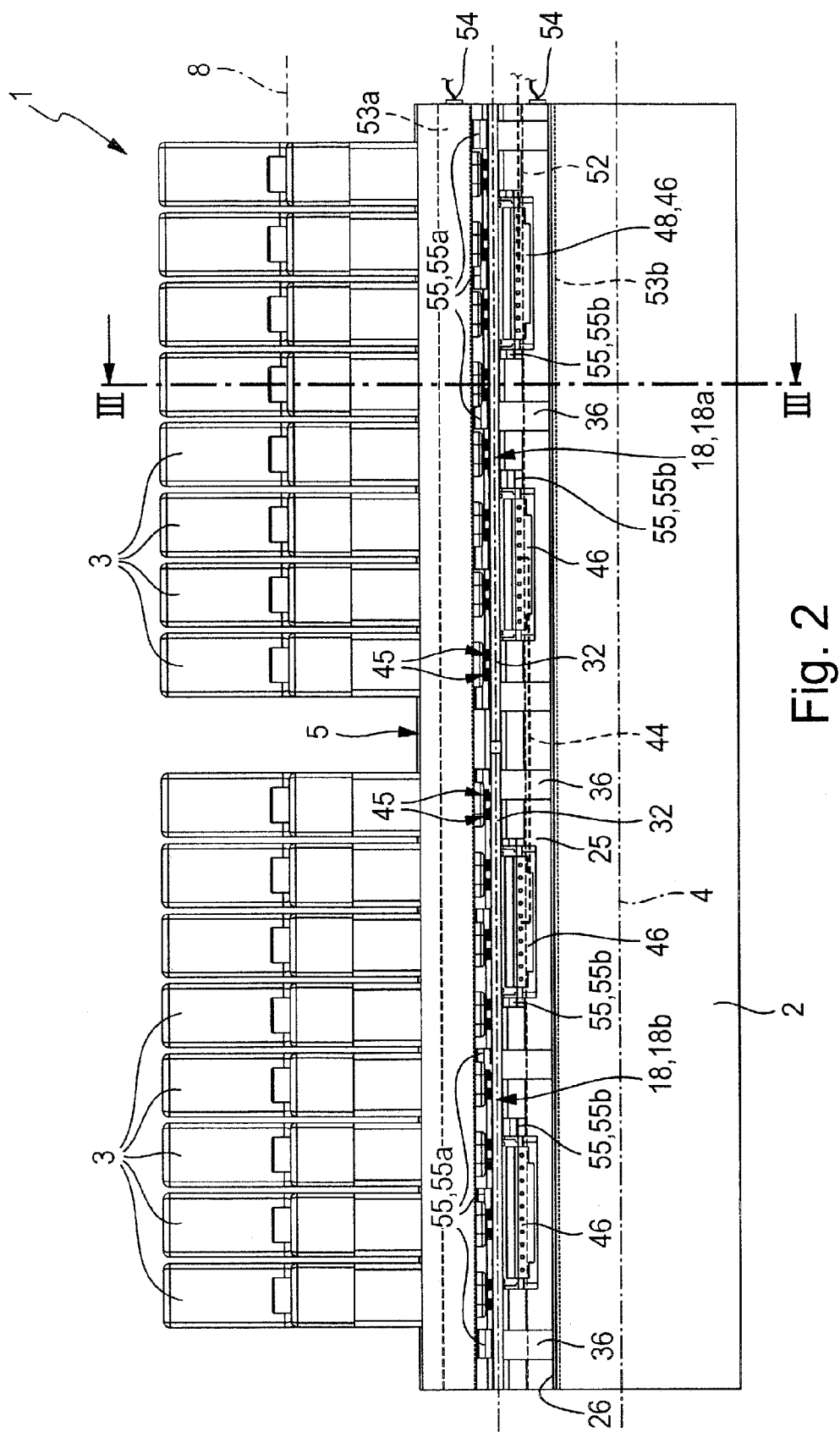
FIG. 2 is a side view of the valve assembly from FIG. 1 in the direction of arrow II from FIG. 1 without the cover strip of the mounting opening.

FIGS. 2 and 3 show clearly that the two electric current conduction rods 53a, 53b extend in the interior of the valve support 2 next to the control circuit board 18 in the line-up direction 8. Each of the electric conduction rods 53a, 53b expediently has a linear dimension and a longitudinal axis which is parallel to the line-up direction 8.

On each of the electric power conduction rods 53a, 53b, a feed-in interface 54 is provided, which is in particular placed on an end face. An electric cable leading to a power supply device can be connected there. One electric conduction rod 53a defines the positive pole, the other electric conduction rod 53b the negative pole.

The control circuit board 18 comprises a plurality of takeoff contact means 55 by which it is contacted to the two electric conduction rods 53a, 53b. The control circuit board 18 preferably contains a row of first takeoff contact means 55a which are arranged in the line-up direction 8 at a distance from one another and a row of second takeoff contact means 55b which are likewise arranged in the line-up direction 8 at a distance from one another. The first takeoff contact means 55a provide electric contact to a first electric conduction rod 53a, while the second takeoff contact means 55b provide electric contact to the other, second, electric conduction rod 53b.

As a result of the fact that the control circuit board 18 is contacted to each of the two electric conduction rods 53a, 53b via a plurality of takeoff contact means 55a, 55b, the electric load is distributed while the electric supply energy is transmitted from the electric conduction rods 53a, 53b to the at least one control electronic arrangement 43.

As the takeoff contact means 55 are designed as direct parts of the control circuit board 18—being preferably secured to the circuit board body 32—they can be immediately contacted to the electric conduction rods 53a, 53b while the control circuit board 18 is being inserted into the reception passage 25. The two electric conduction rods 53a, 53b are preferably placed in the valve support 2 in such a way that they come to lie perpendicular to the main dimensional plane 32a on both sides of the circuit board body 32. With the section of the circuit board body 32 which is assigned to the rear longitudinal edge 33a, the control circuit board 18 projects between the electric conduction rods 53a, 53b, which are placed opposite one another at a lateral distance. In the illustrated example, the electric conduction rods 53a, 53b are arranged at a distance from one another in a direction perpendicular to the mounting surface 5 and define between themselves a free space which is wider than the thickness of the circuit board body 32.

The takeoff contact means 55 are located in the section of the circuit board body 32 which lies between the two electric conduction rods 53a, 53b. The first takeoff contact means 55a are placed on the top side 38b of the circuit board body 32, while the second takeoff contact means 55b are placed on its underside. The takeoff contact means 55 expediently lie in a plane which also contains the longitudinal axes of the two electric conduction rods 53a, 53b.

Each of the takeoff contact means 55 is connected to a control electronics 43 of the control circuit board 18 in an electrically conductive manner. Each of the takeoff contact means 55 bridges a distance between the circuit board body 32 and an electric conduction rod 53a, 53b and contacts in an electrically conductive manner a takeoff surface 56 on the respective electric conduction rod 53a, 53b. In this way, an electrically conductive connection is established between the electric conduction rod 53a, 53b and at least one control electronics 43 of the control circuit board 18.

The takeoff surface 56 is preferably flat and extends, in particular continuously, along the entire axial length of the respective electric conduction rod 53a, 53b.

As a result of the fact that the takeoff contact means 55 are only in loose contact with the associated takeoff surface 56, preferably under preload, it is possible to establish a contact between the takeoff contact means 55 and the takeoff surfaces 56 while the control circuit board 18 is inserted into the reception passage 25 through the mounting opening 26.

The reception passage 25 is on one side bounded by the lower wall surface 37 mentioned above and moreover by an opposite upper wall surface 57 facing the lower wall surface 37. Like the base surface 34, both wall surfaces 37, 57 are expediently represented by the valve support 2 directly. The first electric conduction rod 53a is preferably placed in the region of the upper wall surface 57, the second electric conduction rod 53b in the region of the lower wall surface 37.

In the illustrated embodiment, the takeoff contact means 55 are designed as spring contact means, bearing against the associated takeoff surface 56 under spring preload. The spring preload is preferably chosen high enough to ensure that the control circuit board 18 is resiliently clamped by the takeoff contact means 55 between the two electric conduction rods 53a, 53b, being held non-positively. Even without any additional measures, this can ensure that the control circuit board 18 maintains its chosen installation position.

In the region of the mounting opening 26, the reception passage 25 is expediently wider than in the region of the takeoff surfaces 56. Owing to this arrangement, the control circuit board 18 can easily be inserted in the assembly process, requiring no or only a slight resilient compression of the takeoff contact means 55. At least one of the two wall surfaces 37, 57—in the illustrated embodiment only the lower wall surface 37—is preferably provided with at least one inclined surface section, which forms a guide surface 37a for the associated takeoff contact means 55 and in the region of which the width of the reception passage 25 is reduced to the distance between the takeoff surfaces 56. As a result, the takeoff contact means 55 are compressed continuously when the control circuit board 18 is inserted into the reception passage 25, until they arrive at the takeoff surfaces 56. This facilitates the assembly process.

The electric conduction rods 53a, 53b can in principle be secured to the valve support 2 in different ways. The variant implemented in the illustrated embodiment is considered to be particularly advantageous, with each of the electric conduction rods 53a, 53b being at least partially accommodated and held in its own mounting groove 58a, 58b, which is formed in the valve support 2 and extends in the line-up direction 8. Each mounting groove 58a, 58b is open towards the reception passage 25, so that the takeoff surface 56 of the electric conduction rod 53a, 53b held therein is accessible to the takeoff contact means 55.

In the illustrated embodiment, one mounting groove 58a is formed in the upper wall surface 57, while the other mounting groove 58b is formed in the lower wall surface 37 of the reception passage 25.

The entire cross-section of the electric conduction rod 53a, 53b is expediently accommodated in the interior of the mounting groove 58a, 58b. The takeoff surface 56 is expediently flush with the surface sections of the upper and lower wall surfaces 57, 37 which adjoin the opening of the mounting groove 58a, 58b. In a variant of the embodiment, the electric conduction rod 53a, 53b projects from the longitudinal opening of the mounting groove 58a, 58b with a section of its cross-section provided with the takeoff surface 56.

It is advantageous if the electric conduction rod 53a, 53b is non-rotatably secured in the associated mounting groove 58a, 58b, so that it cannot be twisted about its longitudinal axis relative to the valve support 2. This ensures a constant orientation of the takeoff surface 56 relative to the associated row of takeoff contact means 55a, 55b in contact therewith.

In the illustrated embodiment, this non-rotatable mounting is achieved by giving the electric conduction rod 53a, 53b a non-circular external cross-sectional contour, which could for example in principle be an oval contour or a partially rounded and partially flattened external contour. In a preferred variant, the external cross-sectional contour of the electric conduction rod 53a, 53b has a—preferably regular—polygonal shape. In the illustrated embodiment, a hexagonal cross-section is implemented. The cross-section of the associated mounting groove 58a, 58b is complementary in design. One of the several external surfaces of each electric conduction rod 53a, 53b forms the takeoff surface 56.

In deviation from the illustrated embodiment, the electric conduction rod 53a, 53b may for example have a round and in particular a circular external contour.

The electric conduction rod 53a, 53b is for example secured in the associated mounting groove 58a, 58b by axial insertion. Its axial position relative to the valve support 2 can be fixed by end face support elements not shown in the drawing; these support elements may for example be represented by end face end covers of the valve support 2.

If the valve support 2 is made of metal as in the illustrated embodiment, the electric conduction rods 53a, 53b have to be electrically insulated against this. This is preferably achieved by providing that each electric conduction rod 53a, 53b is composed of several components. A component of each electric conduction rod 53a, 53b identified as a core body 62 is made of an electrically conductive metal, preferably consisting of copper. It also forms the takeoff surface 56. A further component is an insulation body 63, which is preferably made of a plastic material and which encloses the outer circumference of the core body 62 with the exception of the region representing the takeoff surface 56. In this way, an insulation body 63 is placed between the core body 62 and the wall surface of the mounting groove 58a, 58b, preventing an electrically conductive contact between the core body 61 and the valve support 2.

The insulation body 63 can for example be applied to the core body 62 as an adhesive coating. In the illustrated embodiment, it is designed as a sheathing element which is separate from the core body 62, profiled to match the external contour of the core body 62 to be insulated and pushed onto the core body 62.

The external contour of the core body 62 and the internal contour of the separate insulation body 63 are matched to one another in such a way that the core body 62 cannot be rotated relative to the insulation body 63. In cross-section, the external contour of the core body 62 and the internal contour of the separate insulation body 63 are expediently correspond to the outer circumference of the electric conduction rod 53a, 53b, which is partially defined by the insulation body 63, the rest being defined by the takeoff surface 56 of the core body 62.

Owing to the illustrated arrangement of the electric conduction rods 53a, 53b, the takeoff surfaces 56 are located in the reception passage 25, forming in a manner of speaking a section of the wall surface of the reception passage 25 which bounds the reception passage 25.

If the valve support 2 consists of an electrically non-conductive material at least in the region of the mounting grooves

58a, 58b, the electric conduction rods 53a, 53b do not require the insulation body 63, and each of the electric conduction rods 53a, 53b can then consist entirely of metal and in particular copper.

As a result of the configuration described above, the control circuit board 18 and the electric conduction rods 53a, 53b are sealed against the environment and encapsulated in the interior of the valve support 2, therefore being shielded against environmental effects, in particular moisture. In this context, it should be understood that the reception passage 25 cannot only be tightly sealed at the mounting opening 26, but it is also closed at its two opposite end faces by closing elements of the valve support 2 which are not shown in the drawing. These closing elements are for example represented by end covers of the valve support 2.

The protected placement of the electric conduction rods 53a, 53b in the interior of the valve support 2 offers the further advantage that they cannot be touched inadvertently, which would otherwise involve a high injury potential at the high amperage values to be expected.

In the illustrated embodiment, each control electronic circuit 43 acts, expressed in simple terms, in a manner comparable to a relay. On the basis of the electric control signals which are fed into the control circuit board 18 independently of the supply current supplied by means of the electric conduction rods 53a, 53b, the actuating signals for the valves are generated using the supply voltage applied to the electric conduction rods 53a, 53b.

What is claimed is:

1. A valve assembly comprising a valve support and a plurality of electrically actuated valves arranged successively in a line-up direction on the outside of the valve support, wherein a reception passage is formed in the interior of the valve support for the reception of a control circuit board which is provided with at least one control electronics and extends in the line-up direction, and to which the installed valves are electrically contacted for receiving electric actuating signals required for their operation, and which is provided with control interfacing means for the reception of electric control signals responsible for the generation of the actuating signals, and wherein electric supply lines for the power supply of the valves independent of the supply of the control signals are accommodated in the interior of the valve support, wherein the electric supply lines are represented by electric conduction rods separate from the control circuit board and secured to the valve support independently of the control circuit board, wherein they extend next to the control circuit board in the line-up direction and are electrically contacted to the control circuit board by takeoff contact means.

2. A valve assembly according to claim 1, wherein each of the electric conduction rods has a takeoff surface on the outside, which is in electrically conductive contact with one or more of the takeoff contact means.

3. A valve assembly according to claim 2, wherein the takeoff surface has a flat shape.

4. A valve assembly according to claim 2, wherein at least one of the electric conduction rods is arranged such that its takeoff surface is located in the reception passage and/or bounds the reception passage.

5. A valve assembly according to claim 2, wherein the takeoff contact means bear against the associated takeoff surface under spring preload.

6. A valve assembly according to claim 2, wherein at least one of the electric conduction rods has an electrically conductive core body made of metal and an insulation body which sheathes the core body, apart from the takeoff surface, at least in the contact region with the valve support.

7. A valve assembly according to claim 6, wherein the insulation body is represented by a sheathing element pushed onto the core body.

8. A valve assembly according to claim 1, wherein the takeoff contact means are spring contact elements.

9. A valve assembly according to claim 1, wherein the takeoff contact means are parts of the control circuit board.

10. A valve assembly according to claim 9, wherein the control circuit board comprises a circuit board body to which the takeoff contact means are secured.

11. A valve assembly according to claim 1, wherein each of the electric conduction rods is contacted by a plurality of takeoff contact means arranged at a distance from one another in the line-up direction.

12. A valve assembly according to claim 1, wherein at least one of the electric conduction rods is at least partly accommodated and held in a mounting groove of the valve support, which mounting groove is open longitudinally towards the reception passage and extends in the line-up direction.

13. A valve assembly according to claim 12, wherein the electric conduction rod is non-rotatably secured in the valve support.

14. A valve assembly according to claim 1, wherein at least one of the electric conduction rods has a non-circular external cross-sectional contour.

15. A valve assembly according to claim 14, wherein the non-circular external cross-sectional contour is a polygonal contour.

16. A valve assembly according to claim 14, wherein the non-circular external cross-sectional contour is a hexagonal contour.

17. A valve assembly according to claim 1, wherein the control circuit board projects between two electric conduction rods arranged opposite one another at a lateral distance and is contacted to both electric conduction rods via independent takeoff contact means.

18. A valve assembly according to claim 17, wherein the control circuit board is clamped between the two electric conduction rods by a resilient force of the takeoff contact means.

19. A valve assembly according to claim 1, wherein the control circuit board is provided with a plurality of supporting posts by which it is supported against a wall surface of the reception passage.

20. A valve assembly according to claim 1, wherein the reception passage has in its long side a slot-like mounting opening for the control circuit board, which is bounded by the valve support.

21. A valve assembly according to claim 20, wherein the valve assembly is provided with a cover strip which can be or is releasably fitted to the valve support for closing the mounting opening.

22. A valve assembly according to claim 1, wherein the control circuit board comprises a plurality of circuit board elements, which are lined up in the line-up direction and can be or are electrically connected to one another, wherein at least one of the circuit board elements comprises the control interfacing means for the reception of control signals.

23. A valve assembly according to claim 22, wherein each of the circuit board elements is provided with a control electronics.

\* \* \* \* \*